(12) United States Patent
Holder et al.

(10) Patent No.: US 11,486,508 B2
(45) Date of Patent: Nov. 1, 2022

(54) DEEP SET SAFETY VALVE

(71) Applicant: Superior Energy Services, LLC, Harvey, LA (US)

(72) Inventors: Barry Kent Holder, Montgomery, TX (US); Todd Chretien, Houston, TX (US); James Easey, Cypress, TX (US); Ranjit Singh, Houston, TX (US); Andre Orban, Sugarland, TX (US); Daniel Maurice Lerner, Missouri City, TX (US)

(73) Assignee: Superior Energy Services, LLC, Harvey, LA (US)

( * ) Notice: Subject to any disclaimer, the term of this patent is extended or adjusted under 35 U.S.C. 154(b) by 524 days.

(21) Appl. No.: 16/705,927

(22) Filed: Dec. 6, 2019

(65) Prior Publication Data

US 2020/0141506 A1 May 7, 2020

Related U.S. Application Data

(63) Continuation-in-part of application No. PCT/US2018/036531, filed on Jun. 7, 2018.
(Continued)

(51) Int. Cl.
*E21B 34/10* (2006.01)
*F16K 17/30* (2006.01)
(Continued)

(52) U.S. Cl.
CPC .............. *F16K 17/30* (2013.01); *E21B 34/16* (2013.01); *F16K 27/003* (2013.01); *E21B 2200/05* (2020.05)

(58) Field of Classification Search
CPC ........ F16K 17/30; F16K 27/003; E21B 34/16; E21B 2200/05
See application file for complete search history.

(56) References Cited

U.S. PATENT DOCUMENTS 3,796,257 A 3/1974 Hudson
5,070,944 A * 12/1991 Hopper ................. E21B 34/066
251/129.21
(Continued)

OTHER PUBLICATIONS

PCT Application No. US2018/036531; International Search Report for Applicant Superior Energy Services, LLC dated Oct. 16, 2018.
(Continued)

*Primary Examiner* — P. Macade Nichols
(74) *Attorney, Agent, or Firm* — Jones Walker LLP

(57) ABSTRACT

An actuator sub for generating hydraulic pressure having a sub housing which includes (i) an outer surface, (ii) a main flow passage extending though the sub housing, and (iii) a wall space formed between the main flow passage and the housing outer surface. At least a first hydraulic tube is position in the wall space and an equalization port is configured to transmit pressure in the main flow passage to the first hydraulic tube. A drive motor driving an bi-directional hydraulic motor, are positioned in the first hydraulic tube, with the hydraulic motor being configured to output fluid to a fluid outlet of the first hydraulic tube, and the hydraulic motor, when not under power, allowing the reverse flow of fluid through the hydraulic motor. The actuator sub includes the absence of a check valve along a path carrying fluid between the hydraulic motor and the outlet of the second hydraulic tube.

10 Claims, 12 Drawing Sheets

Related U.S. Application Data

(60) Provisional application No. 62/516,748, filed on Jun. 8, 2017.

(51) Int. Cl.
 *F16K 27/00* (2006.01)
 *E21B 34/16* (2006.01)

(56) References Cited

U.S. PATENT DOCUMENTS

| | | |
|---|---|---|
| 6,053,251 A | 4/2000 | Deaton |
| 6,269,874 B1 | 8/2001 | Rawson et al. |
| 9,010,448 B2 | 4/2015 | Williamson, Jr. et al. |
| 9,631,456 B2* | 4/2017 | Vick, Jr. ............... F16K 31/124 |
| 2005/0178557 A1 | 8/2005 | Johansen et al. |
| 2007/0007012 A1 | 1/2007 | Bartlett et al. |
| 2009/0038804 A1 | 2/2009 | Going, III |
| 2016/0258250 A1 | 9/2016 | Vick, Jr. et al. |
| 2018/0355698 A1* | 12/2018 | Williamson ............ E21B 34/16 |

OTHER PUBLICATIONS

PCT Application No. US2018/036531; International Preliminary Reporton Patentability for Applicant Superior Energy Services, LLC dated Dec. 10, 2019.

\* cited by examiner

DEEP SET SAFETY VALVE

CROSS-REFERENCE TO RELATED APPLICATION

This application is a continuation-in-part of PCT/US2018/036531 filed Jun. 7, 2018, which claims the benefit of and priority to U.S. Provisional Patent Application No. 62/516,748 filed on Jun. 8, 2017, both of which are incorporated herein by reference in their entirety.

FIELD OF INVENTION

This invention relates to controlling tools in a wellbore. In one example, the tool to be controlled is a Surface Controlled Subsurface Safety Valve (SCSSV). In certain embodiments, the SCSSV is coupled with a hydraulic control system in close proximity to the valve that alleviates the mechanical depth constraints of standard mechanical spring valves.

BACKGROUND OF INVENTION

Surface Controlled Subsurface Safety Valves are traditionally used in high risk flowing wells in sensitive environments where loss of well control could be catastrophic. The valve is often controlled with a hydraulic line attached to the valve that runs back through the wellhead to a hydraulic pump and control panel at surface. Application of hydraulic pressure keeps the valve in an open position. The valves have a "fail-safe" feature where any loss of hydraulic pressure will cause the valve to close. The most common valve configuration has a hydraulic cylinder containing seals on a rod piston tied to a flow tube that pushes the flapper open allowing the well to flow. A mechanical spring below the flow tube pushes the tube closed when pressure is lost through the control line. This type valve has mechanical limitations due to force available from a spring versus the hydrostatic loads the rod piston seals may see during a failure. In most cases deep water drilling requires the safety valve be set deeper than the mechanical spring force allows. To overcome this limitation, safety valve manufacturers use technology such as nitrogen charged chambers to compensate for the spring limitations and continue to use the standard hydraulic control through control line. Others use dual "balanced line" control lines. Surface operated hydraulic control line systems have many problems. The fluid travels through temperature extremes that affect the flow characteristics. Long distances though small control lines can take an extended period of time to move the fluid required to operate the device. Some devices use electric actuated hydraulic pumps to control safety valves. They are complex in nature and contain features that provide additional risk of failure. There remains a need for a simple, reliable safety valve solution for deep setting depths. The present disclosure provides a simplified solution that eliminates many of the aforementioned problems and risks.

DETAILED DESCRIPTION OF SELECTED EMBODIMENTS

Figure 1:
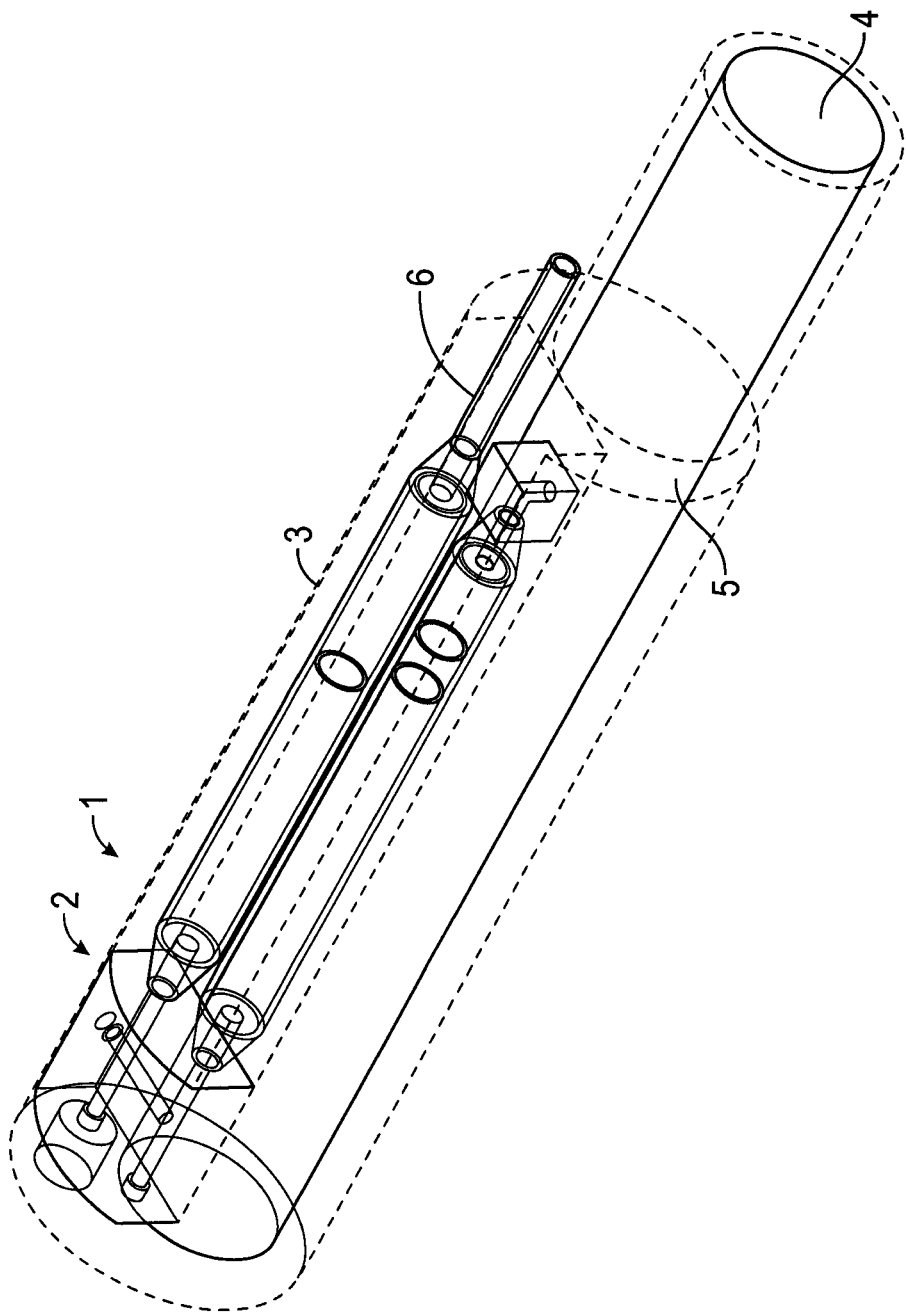
FIG. 1 is perspective phantom view of one embodiment of the actuator sub of the present invention.

FIG. 1 illustrates one embodiment of the actuator sub 1 for generating hydraulic pressure disclosed in this application. Actuator sub 1 generally comprises the sub housing 2 with an outer surface 3 and a main flow passage 4 extending through sub housing 2. The wall space 5 is formed between the central flow passage 4 and outer surface of sub housing 2. As one example, the inner diameter of flow passage 4 could be approximately 5 inches and the outer diameter of sub housing 2 could be approximately 8 inches, leaving a wall space 5 approximately 1.5 inches thick for a concentric sub. In an eccentric sub, the 1.5 inches of wall space would be only along a portion of the sub circumference with the wall thickness being much less on the remainder of the circumference. Within the wall space 5 is milled the groove or compartment 6. In the illustrated embodiment, compartment 6 is milled through outer surface 3, but in other embodiments, compartment 6 may be milled into the wall space without removing outer surface 3, e.g., compartment 6 may be formed as a series of bores in the wall space.

Figure 2:
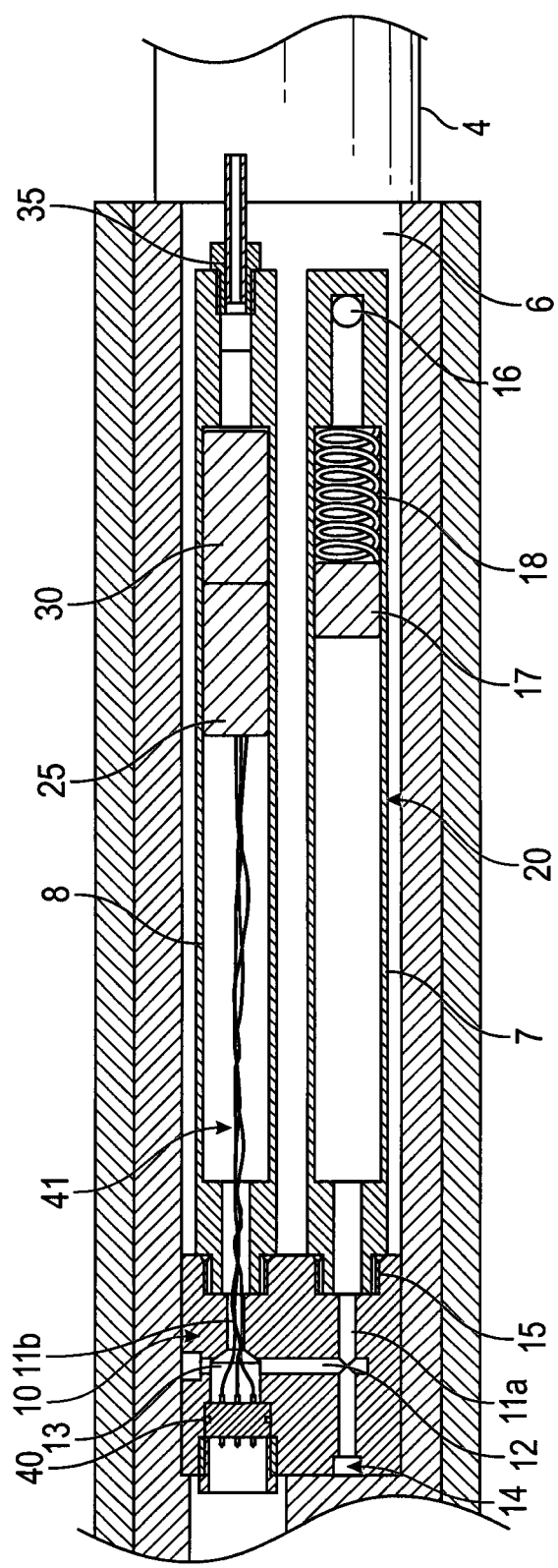
FIG. 2 is a cross-sectional view of an actuator sub similar to FIG. 1.

FIG. 2 is a cross-sectional view more clearly illustrating the components positioned within compartment 6. First hydraulic fluid tube 7 and second hydraulic fluid tube 8 are positioned to engage manifold 10. The hydraulic fluid tubes may also be more concisely referred to herein as "hydraulic tubes" or "fluid tubes." These hydraulic tubes are typically sealed either to retain hydraulic fluid at a pressure higher than the operating environment, or in certain embodiments, to protect electronics within the tube from external high pressure fluids in the operating environment. In the FIG. 2 embodiment, hydraulic tubes 7 and 8 are separate cylindrical hollow tubes which have threaded connections 15 engaging manifold 10. The open ends of hydraulic tubes 7 and 8 which engage manifold 10 are in fluid communication with the tube channels 11a and 11b, respectively. The manifold cross channel 12 connects tube channels 11a and 11b, forming a flow path from hydraulic tube 7 to hydraulic tube 8. Although the illustrated hydraulic tubes are separately formed components, it will be readily understood that alternative hydraulic tubes may be formed by drilling bores directly into the material of wall space 5. Toward the end of hydraulic tube 7 opposite manifold 10, there is the pressure equalization port 16, which allows fluid communication between main flow passage 4 and the interior of hydraulic tube 7. A pressure piston 17 is positioned in hydraulic tube 7 and acts to separate well bore fluids entering from main flow passage 4 from the hydraulic fluid that will otherwise fill hydraulic tubes 7 and 8. It will readily be understood how the pressure of fluid in main flow passage 14 will be transmitted through equalization port 16 to pressure piston 17, which then transmits the pressure to the fluid in the hydraulic tube 7. The biasing mechanism or spring 18 will act to place a further positive pressure (i.e., pressure above main flow passage pressure) on the hydraulic fluid in the hydraulic tubes 7 and 8. In one example, spring 18 will maintain the hydraulic fluid at a pressure about 25 psi to about 300 psi above the main flow passage pressure. It will be understood that the volume to the left (in FIG. 2) of piston 17 in hydraulic tube 7 and the volume in hydraulic tube 8 will form a hydraulic fluid reservoir 20. In one preferred embodiment, the hydraulic fluid may be Lubsoil® Motor Fluid No. 3 available from Tulco Oils, Inc. of Tulsa, Okla.

FIG. 2 illustrates hydraulic tube 8 as including drive motor 25 and hydraulic motor 30. In the illustrated embodiment, drive motor 25 is an electric motor such as an induction motor, brush commutated motor, permanent magnet motor, or a permanent magnet motor with electronic commutation. However, drive motor 25 could also be another motor type, such as a hydraulic motor. Where drive motor 25 is a hydraulic motor, hydraulic fluid could be circulated from the surface in order to power such a hydraulic motor, i.e., fluid from the surface could be circulated to the hydraulic motor and then returned to the surface, or alternatively, fluid circulated from the surface could be exhausted to the wellbore after passing through the hydraulic motor. In the case where drive motor 25 is electric, wires 41 may extend through the power port 13 in manifold 10 and connect to drive motor 25. The bulkhead plug 40 will form a fluid-tight seal through which wires 41 travel and allow connection of a power source to bulkhead plug 40. In one example, the power source is an electrical line extending to the surface. In many embodiments, a control device or means at the surface, such as a Programmable Logic Controller or PLC, may be utilized to control the current and voltage of drive motor 25, or otherwise receive signals from down sensors and/or control other electronic components downhole.

Alternatively, other embodiments could include part or all of the control electronics downhole, either within the actuator sub 1 or in a separate electronics sub suitable wired to actuator sub 1. There may also be embodiments where an alternative or supplemental power source is provided by batteries position in or near the sub housing 2. This power source could include a transformer or similar device to condition the power input to the drive motor. In certain embodiments, the battery power would act as a temporary power source to prevent very short-term power interruptions/fluctuations from prematurely closing the safety valve.

Hydraulic motor 30 will be a device which accepts torque input from drive motor 25 and drives hydraulic fluid at an elevated pressure toward the outlet tube (or "control line") 35. Although not explicitly shown in FIG. 2, it will be understood that hydraulic fluid in hydraulic tube 8 can move around drive motor 25 to reach the intake area (or low pressure side) of hydraulic motor 30. In many embodiments, hydraulic motor 30 is a "bi-directional" motor (or pump in the FIG. 2 arrangement). Hydraulic motor 30 is bi-directional in the sense that if torque is not applied to motor 30, fluid may flow either way through motor 30 (depending on which side of the motor has the higher pressure). Bi-directional also means that one-way valves or check valves are not positioned in motor 30's immediate flow path, i.e. no check valves are positioned to block fluid backflow as in "uni-directional" pumps.

Figure 3A:
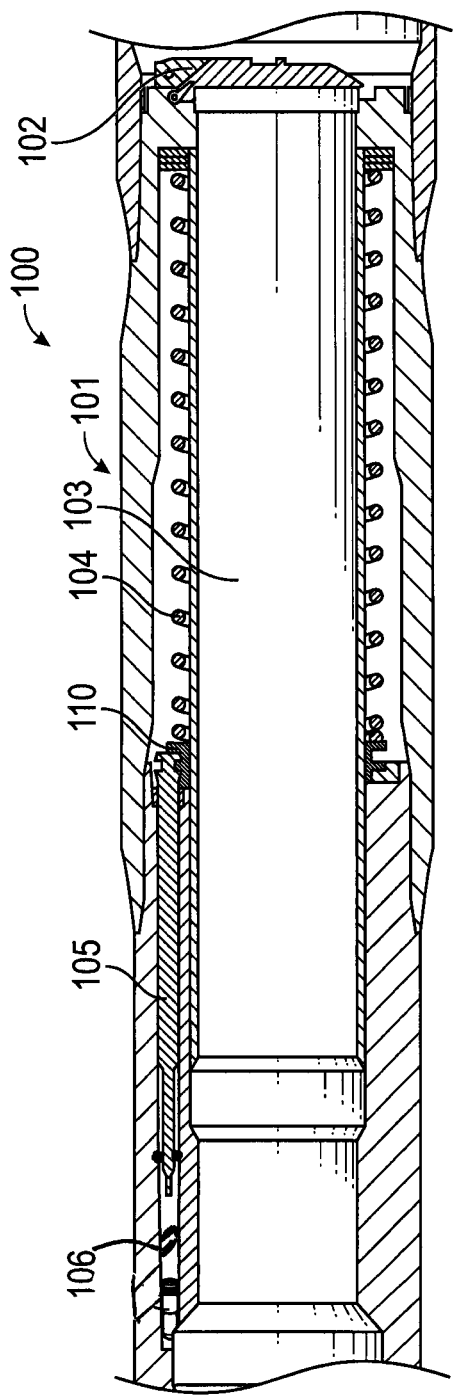
FIG. 3A is a cross-sectional view of a safety valve which may be operated by the actuator sub, the safety valve being in the closed position.
Figure 3B:
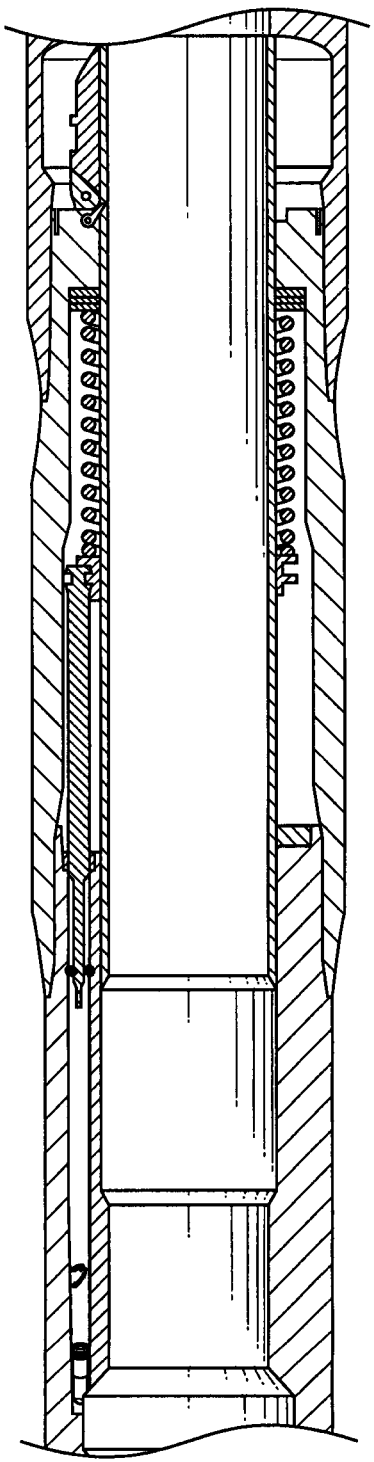
FIG. 3B is a cross-sectional view of the FIG. 3A safety valve, but shown in the open position.

In one embodiment, the bi-directional hydraulic motor 30 is a swashplate pump. However, hydraulic motor 30 could be any conventional or future developed hydraulic motor or pump which fulfills the bi-directional characteristic described above Although actuator sub 1 could be utilized to operate many different pressure controlled downhole tools, in one embodiment actuator sub 1 is employed in combination with a subsurface safety valve. FIGS. 3A and 3B illustrate a conventional subsurface safety valve 100 which includes the valve housing 101, flapper 102, flow tube 103, return spring 104, activating piston 105, and fluid connector port 106. It will be understood that flow tube 103 will include a milled half-moon slot 110 which is engaged by a corresponding milled slot on the head portion of activating piston 105, thereby allowing piston 105 to impart force to flow tube 103. Although not explicitly shown in the Figures, but similar to most conventional flapper valves, flapper 102 will have a spring biasing it in the closed position. Pressurized fluid entering connection port 106 will act on activating piston 105, which then moves flow tube 103 downward, overcomes the force of return spring 104, allowing flow tube 103 to push open flapper 102 (see FIG. 3B). If pressure on piston 105 is released, return spring pushes flow tube 103 upwards, allowing flapper 102 to close Actuator sub 1 will be connected directly to or in comparatively close proximity to safety valve 100 in the downhole string. A hydraulic line will connect the output tube 35 of actuator sub 1 to the fluid connection port 106 of safety valve 100. Power applied to drive motor 25 will cause drive motor 25 to supply hydraulic motor 30 with the torque required to deliver pressurized fluid to fluid connection port 106, overcome return spring 104, and ultimately open flapper 102. As long as power is supplied to drive motor 25, hydraulic motor 30 will continue to maintain the fluid pressure needed to keep flow tube 103 extended and flapper 102 in the open position. However, if power to drive motor 25 is interrupted, the force of return spring 104 is able to force activation piston 103 rearward. Because hydraulic motor 30 is bidirectional, the fluid which was acting on activation piston 103 moves in the reverse direction through hydraulic motor 30 and back into fluid reservoir 20 of activator sub 1. In this manner, the disruption of power to drive motor 25 causes safety valve 100 to return to the closed position, i.e., safety valve 100 fails in the closed position.

In many embodiments, the amperage of current supplied to drive motor 25 governs the output power (torque) of the drive motor while voltage governs speed of the drive motor, and thus, these two variables can be used to regulate the pressure of the fluid hydraulic motor 30 is capable of generating. This allows control of drive motor amperage/voltage at the surface to control the pressure produced by hydraulic motor 30 and to supply the pressure needed to maintain safety valve 100 in the open position.

Many of the invention's preferred embodiments may be on a separate sub or integral to the safety valve which it controls. Each of these preferred embodiments will have a reservoir that is pressure balanced to the tubing (i.e., main flow passage), a power source, a drive motor, and a hydraulic pump providing hydraulic pressure that opens the safety valve. A fluid recharge port 14 allows for recharge of the hydraulic fluid due to leakage. Although not explicitly shown in the Figures, it will be understood that a recharge sub would be positioned above actuator sub 1. The recharge sub would have a fluid line connection to recharge port 14 and include its own reservoir of hydraulic fluid allowing replacement or refilling of the hydraulic tubes 7 and 8 as necessary.

As suggested above, the manifold 10 allows fluid to travel from the reservoir over to the power assembly 25/30. The power assembly 25/30 includes a power source that could be a battery or hydraulic pump at the surface connected to a drive motor 25 with a coupling that may be a direct drive or a gear reduction connected to a hydraulic motor 30. The drive motor 25 and hydraulic motor 30 may be immersed in hydraulic fluid. The spring 16 assures the reservoir 20 always applies pressure to feed the hydraulic motor 30. The discharge side of the pump includes seals to force fluid through control line 35 when the hydraulic motor is activated. The control line 35 is tied to safety valve connection port receptacle 106 (see FIG. 3A).

Figure 4A:
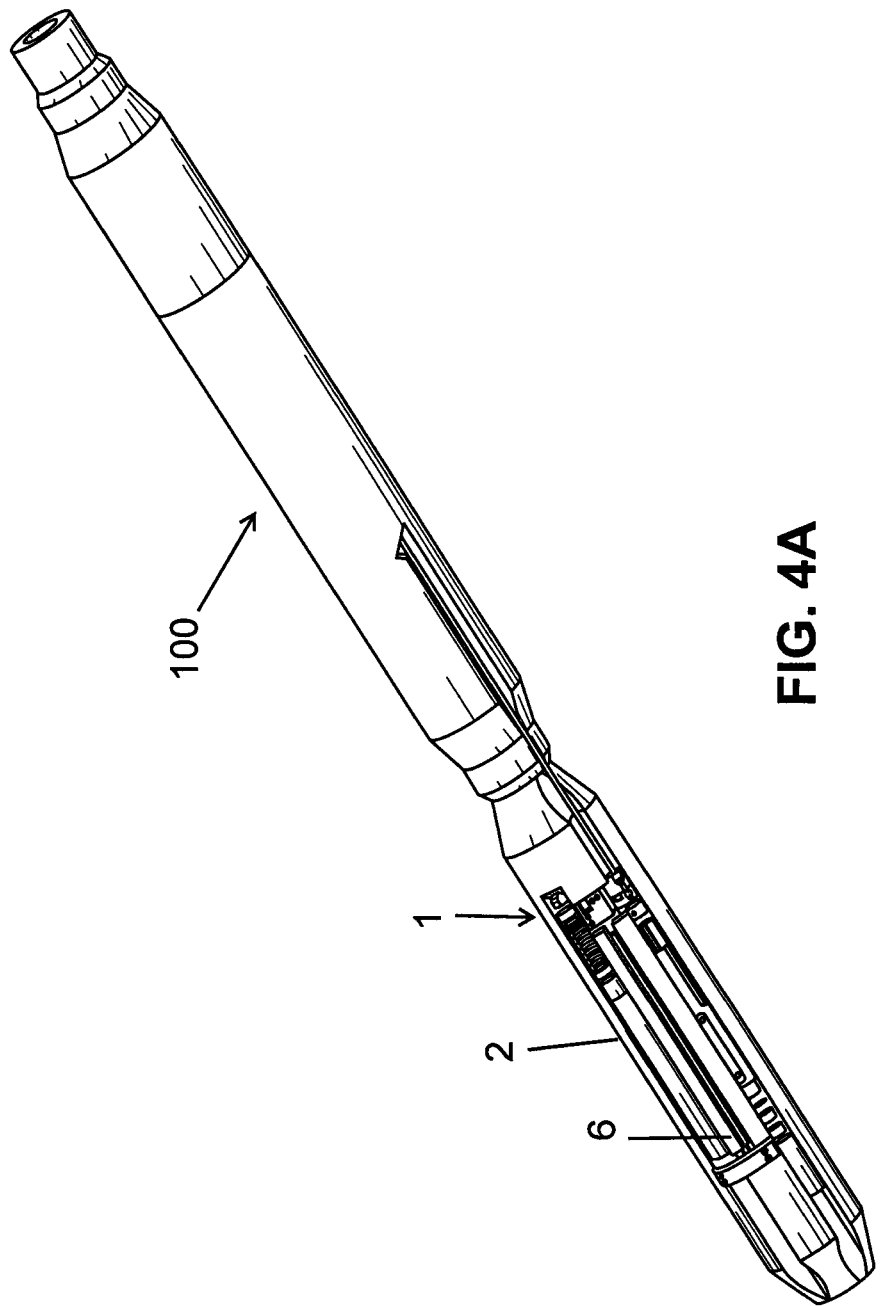
FIG. 4A is a perspective view of second embodiment of a safety valve connected to an actuator sub.
Figure 4B:
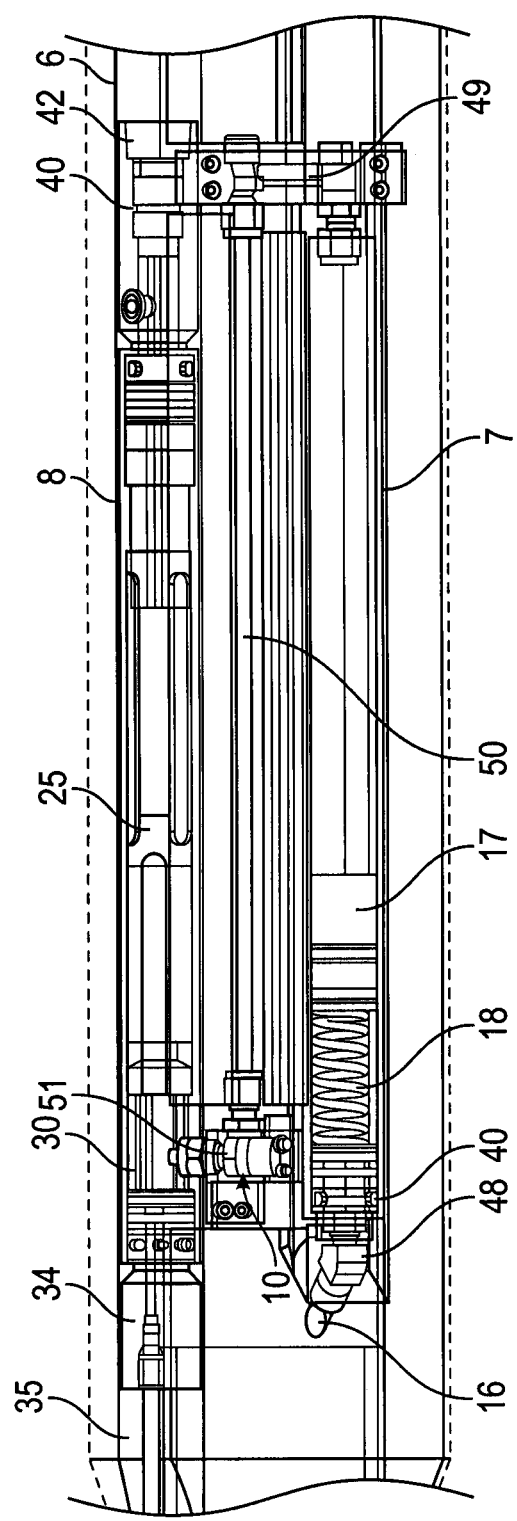
FIG. 4B is a more detailed view of the internal components of the actuator sub seen in FIG. 4A.

FIGS. 4A and 4B illustrate another embodiment of a safety valve 100 operated by an actuator sub 1. In this embodiment, safety valve 100 and actuator sub 1 are separate subs joined by a conventional box-by-pin threaded oilfield connection. FIG. 4A shows a concentric sub housing 2 having grooves 6 cut into the wall space 5 of sub housing 2. Sub housing 2 is concentric in the sense that the wall thickness is substantially the same around the entire circumference of the sub and naturally the grooves 6 do not penetrate into the main flow passage of the sub housing. As more clearly seen in FIG. 4B, a first hydraulic tube 7 and a second hydraulic tube 8 are positioned in adjacent grooves 6. Similar to the embodiment of FIGS. 1 and 2, the FIG. 4B embodiment has a pressure equalization port 16 which allows fluid pressure communication from main flow passage 4, through equalization fitting 48 and bulkhead 40 into first hydraulic tube 7. As in the previous embodiment, the spring 18 and pressure piston 17 will act to impart a pressure in hydraulic fluid occupying the volume of tube 7 to the right (in FIG. 4B) of pressure piston 17. Again, this volume of tube 7 forms a hydraulic fluid reservoir which directs fluid to hydraulic tube 8. The hydraulic fluid is directed through fitting 49, fluid control line 50, and then to fitting 51 which connects control line 50 to hydraulic tube 8. While fitting 51 engages hydraulic tube 8 adjacent to hydraulic motor 30, it will be understood that there is sufficient annular space between the inside surface of tube 8 and hydraulic motor 30 such that hydraulic fluid may freely flow to the low-pressure side of hydraulic motor 30. In other words, the seal dividing the high-pressure side and the low pressure side of motor 30 is to the left (in FIG. 4B) of fitting 51.

The FIG. 4B embodiment also includes the drive motor 25 powering hydraulic motor 30 similar to the FIG. 2 embodiment. Although largely hidden from view in FIG. 4B, a drive shaft extends between drive motor 25 and hydraulic motor 30. The end of hydraulic tube 8 opposite hydraulic motor 30 is sealed with the bulkhead 40 and threaded end cap 42. Wires required for electrical components in tube 8 may pass through bulkhead 40 and end cap 42 in a sealed manner allowing positive hydraulic pressure to be maintained in tube 8. The higher pressure output from hydraulic motor 30 is transmitted through ferrule connector 34 to outlet tube (or control line) 35. The higher pressure fluid in control line 35 may then be routed to the safety valve 1, or potentially any other hydraulically operated downhole tool. The fitting 51 directing fluid to hydraulic tube 8 and the ferrule connector 34 forming the connection to fluid to control line 35 may be considered as part of one embodiment of a manifold 10.

Figure 5A:
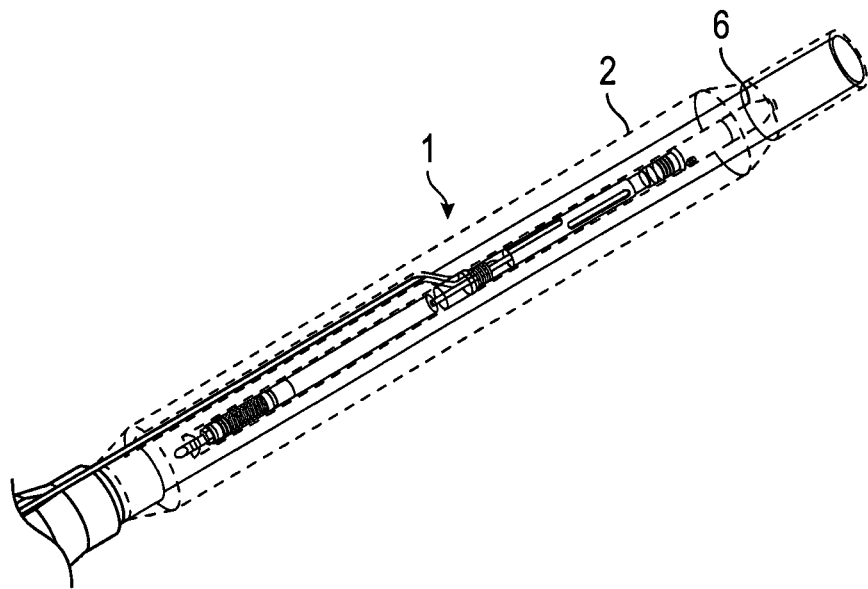
FIG. 5A is a perspective view of a third embodiment of an actuator sub.
Figure 5B:
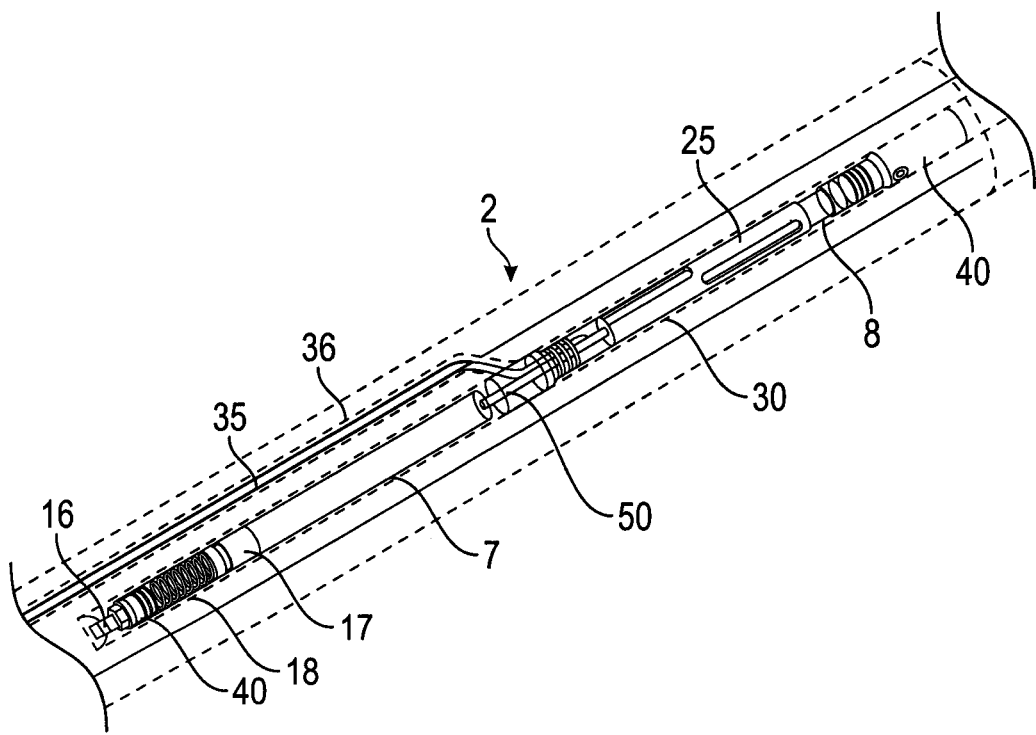
FIG. 5B is a more detailed view of the internal components of the actuator sub seen in FIG. 5A.

A further embodiment of actuator 1 is seen in FIGS. 5A and 5B. FIG. 5A illustrates how this embodiment has a single groove 6 formed in the sub body 2. As more clearly shown in FIG. 5B, both hydraulic tube 7 and hydraulic tube 8 are positioned in this single groove 6. As with previous embodiments, an equalization port 16 connects the sub's main flow passage, through bulkhead 40, to the volume of hydraulic tube 7 to the left (in FIG. 5B) of pressure piston 17. The volume of hydraulic tube 7 forming the hydraulic reservoir (the volume to the right of pressure piston 17 in FIG. 5B) may be connected to hydraulic tube 8 via a short segment of control line 50 which routed to the lower pressure side of hydraulic motor 30. Hydraulic tube 8 further includes the drive motor 25 and is sealed by bulkhead 40 and a threaded endcap (not illustrated). The higher pressure output of hydraulic motor 30 is directed to control line 35 which is routed down sub housing 2 adjacent to hydraulic tube 7 in the control line groove 36. The embodiment of FIGS. 5A and 5B may be referred to as positioning the first and second hydraulic tubes in an "in-line configuration," whereas the embodiment of FIGS. 4A and 4B may be referred to as positioning the first and second hydraulic tubes in a "side-by-side configuration."

Figure 6A:
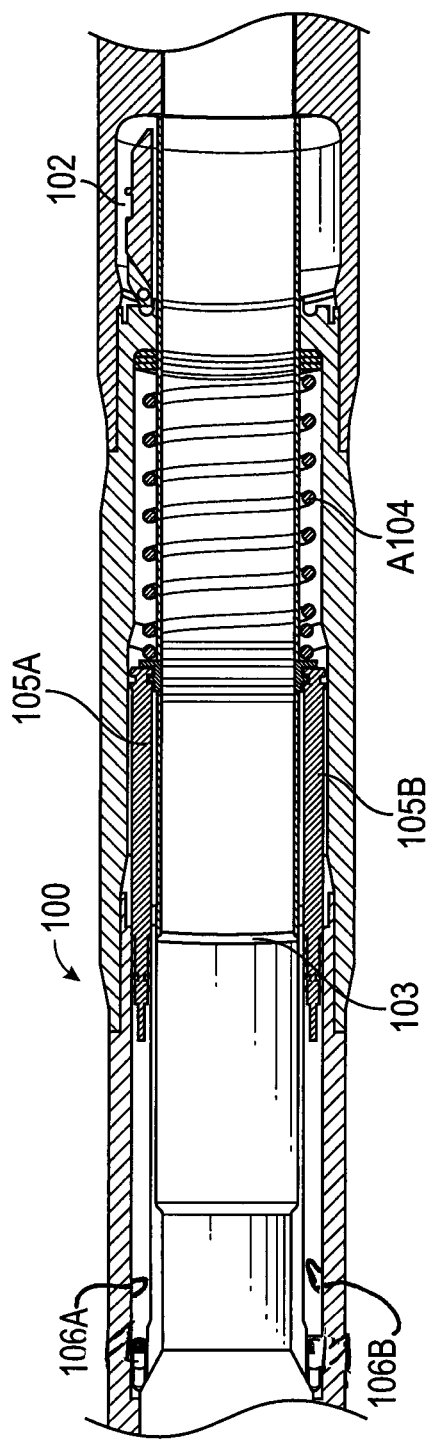
FIG. 6A is a cross-sectional view of a second embodiment of a safety valve which may be operated by the actuator sub, the safety valve being in the open position.
Figure 6B:
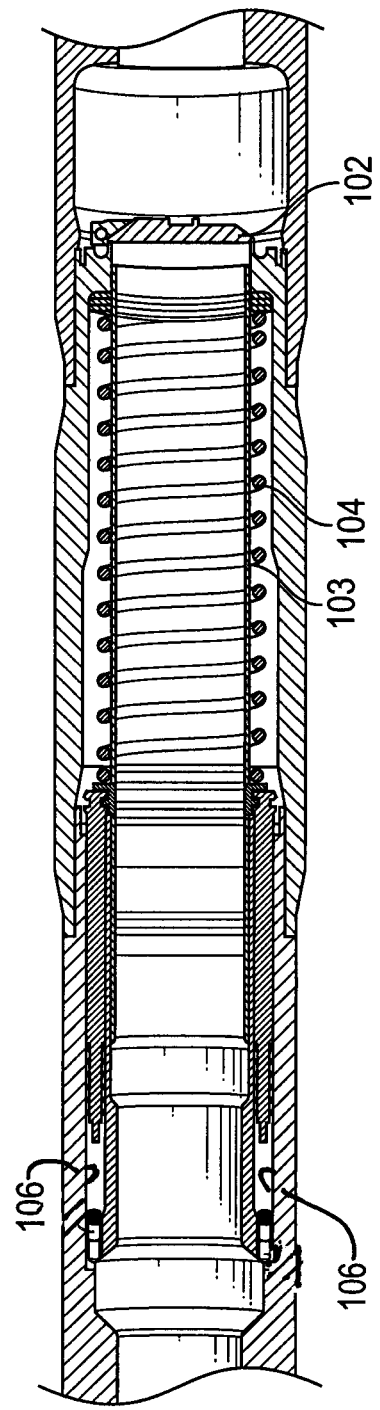
FIG. 6B is a cross-sectional view of the FIG. 6A safety valve, but shown in the closed position.

FIGS. 6A and 6B illustrate a further embodiment of safety valve 100. The FIG. 6 embodiment is similar to the FIG. 3 embodiment in that the FIG. 6 embodiment will include the flapper 102 which may be opened by the extension of flow tube 103. The FIG. 6 embodiment also includes the return spring 104 which biases flow tube 103 toward its retracted position, which would allow flapper 102 to close. The FIG. 6 embodiment differs from FIG. 3 in that FIG. 6 shows two activating pistons acting on flow tube 103 as opposed to the single activating piston seen in FIG. 3. For example, FIG. 6A illustrates a primary activating piston 105A and a secondary activating piston 105B engaging flow tube 103 and moving it to the extended position (i.e., moving flapper 102 in the open state).

In many embodiments, the fluid pressure moving primary activating piston 105A will be supplied by the output of hydraulic motor 30 of the actuator sub 1, i.e., output control line 35 of actuator 1 will be connected to the connection port (primary connection port) 106A, thereby supplying hydraulic fluid to primary activating piston 105A. Additionally, in certain embodiments, hydraulic fluid will also be supplied to secondary activating piston 105B from the hydraulic fluid reservoir (e.g., hydraulic tube 7 in FIG. 4B). In other words, secondary activating piston 105B is exposed to the pressure in the fluid reservoir as opposed to the higher pressure output of hydraulic motor 30 which is routed to primary activating piston 105A. Although not explicitly shown in FIGS. 6A and 6B, certain embodiments of the safety valve may include a position sensor indicating when the secondary activating piston is in the extended or retracted position.

Figure 7:
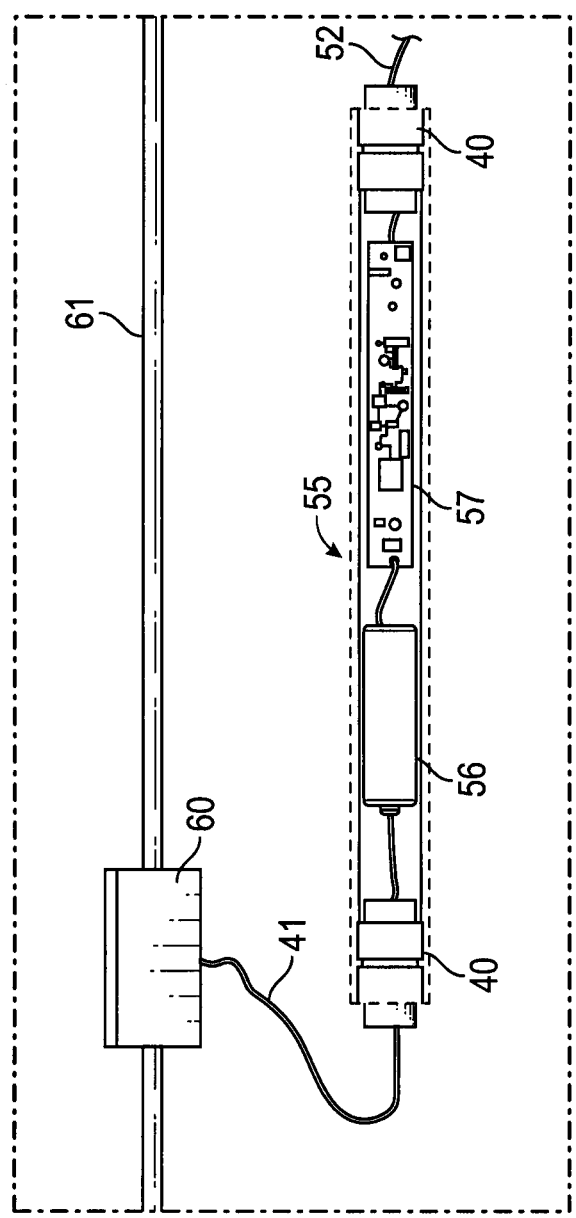
FIG. 7 illustrates a control line and control electronics for use with the FIGS. 6A and 6B safety valve embodiment.

FIG. 7 illustrates one mechanism for transferring reservoir fluid to the secondary connection port 106B seen in FIG. 6A and thus to secondary activating piston 105B. FIG. 7 shows the secondary piston control line 61 which at one end will connect to the fluid reservoir of hydraulic tube 7 (FIG. 4B) and at the other end will connect to safety valve connection port 106B (FIG. 6A). FIG. 7 also shows a valve 60 regulating flow through control line 61. In the illustrated embodiment, valve 60 is an electrically controlled "fail-to-open" valve (aka "fail-open" valve or "normally open"

valve). In other words, fail-to-open valve 60 will remain closed only while power is supplied to the valve. If power is cut off from valve 60, then valve 60 will automatically move to the open position. One example of fail-to-open valve 60 could be model no. 1335BA4AT-24 VDC available from Jefferson Solenoid Valves, USA, Inc. of Miami, Fla. FIG. 7 further illustrates the electronics tube 55 which houses battery 56 and electronics card 57. The bulkheads 40 isolate the interior of electronics tube 55 from outside fluids while allowing wires 41 and 52 from electronics card to extend outside of electronics tube 55, e.g., wires 52 running back to the surface such that electronics card 55 sends and receives signals from the previously discussed PLC. Thus, one function of electronics card 57 is to selectively direct power from battery 56 to fail-to-open valve 40 via wires 41. Electronics card would also receive signals from the position sensor at secondary activating piston 105B indicating whether the piston was in the extended or retracted position. Although not specifically illustrated, it will be understood that electronics tube 55 would be inserted into an addition groove 6 formed in the wall of sub housing 2.

Since control line 61 is connected to secondary activating piston 105B through connection port 106B (FIG. 6A), fail-to-open valve 60 may be operated to affect the position of secondary activating piston 105B. In one example, hydraulic motor 30 will be used to supply pressurized fluid to primary activating piston 105A while no power is applied to valve 60 (i.e., valve 60 remains open). As primary activating piston 105A moves flow tube 103 to the extended position, flow tube 103 will pull secondary activating piston in the same direction. The vacuum created behind secondary piston 105B by its movement will draw fluid from the fluid reservoir in hydraulic tube 7 (with the fluid volume removed from the reservoir being compensated for by the advancing pressure piston 17). Again, fluid may freely flow to secondary activating piston 105B because no power is being supplied to fail-to-open valve 60 and it therefore is in the open position.

In previously embodiments described in reference to FIGS. 3A and 3B, once hydraulic motor 30 had delivered sufficient pressurized fluid to the activating piston to fully extend the flow tube and open the flapper, hydraulic motor 30 had to continuously operate in order to keep the flapper in the open position. However, the FIG. 6 embodiment provides an alternative to this mode of operation. Because secondary activating piston 105B has advanced and drawn hydraulic fluid with it, providing power to fail-to-open valve 60 closes this valve and prevents secondary activating piston 105B from returning to its rearward position. Thus, once fail-to-open valve 60 is closed, operation of hydraulic motor 30 may be stopped (or substantially reduced) without the flow tube 103 and flapper 102 moving to the closed position. In other words, even though primary activating piston 105A now lacks sufficient fluid pressure to maintain flow tube 103 in the extended position, the closed fail-to-open valve 60 prevents secondary activating piston 105B from moving to its flapper closed position. Therefore, this embodiment includes a control means which allows hydraulic motor 30 to operate until primary activating piston 105A has fully extended flow tube 103, then the control means closes fail-to-open valve 60 and ceases (or substantially reduces) operation of hydraulic motor 30. This configuration provides a "temporary hold open" function which maintains flapper 102 open at the much lower power consumption of keeping fail-to-open valve 60 closed as compared to continuously operating hydraulic motor 30. And of course, if there is a complete failure of power throughout the system, then fail-to-open valve opens control line 61, allowing hydraulic fluid to bleed back into the reservoir of hydraulic tube 7 under the force of return spring 104 acting on flow tube 103 and secondary activating piston 105B, thereby allowing flapper 102 to fail to the closed state.

The safety valve operation is simplified and many of the problems and risk associated with items mentioned in prior art are eliminated with the embodiments disclosed herein. The control system disclosed uses a drive motor to turn a hydraulic motor that applies hydraulic pressure to open the safety valve. Once the valve is open energy applied to the drive motor maintains hydraulic pressure keeping the valve open. If the energy is removed the hydraulic motor spins in reverse as the spring pushes the rod piston back to the closed position. The hydraulic fluid returns to the low pressure side of the reservoir.

Figure 8:
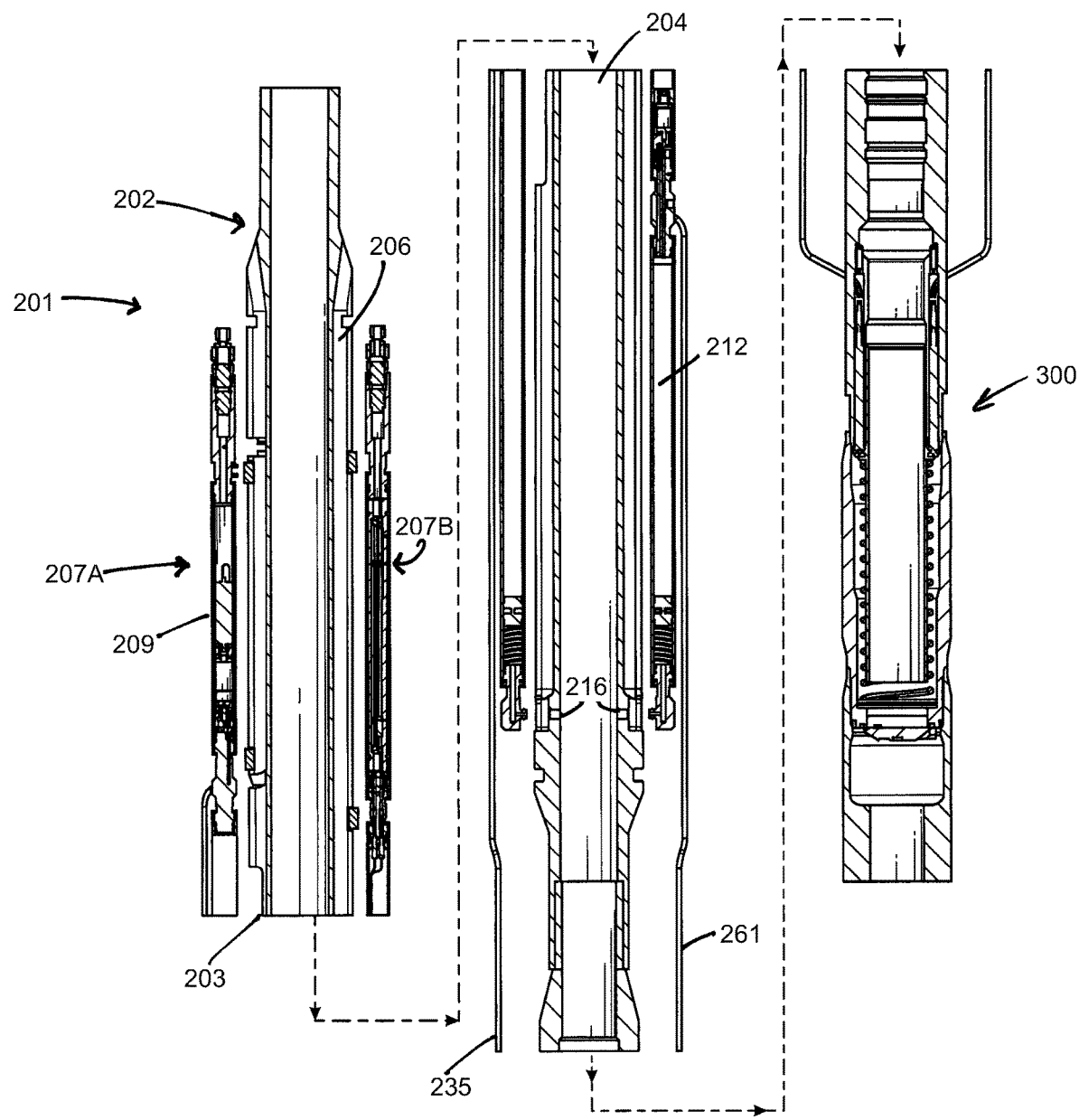
FIG. 8 illustrates a further embodiment of safety valve connected to a actuator sub.

A still further embodiment of the actuator sub and associated safety valve is seen in FIGS. 8 to 11. FIG. 8 illustrates actuator sub 201 connected to the safety valve 300. Like previous embodiments, actuator sub 201 generally includes the actuator sub housing 202 having the main flow passage 204 with the outer housing surface 203. Two tube compartments 206 are formed within recesses in the outer housing surface 203 and these tube compartments will house hydraulic tubes 207A and 207B. While FIG. 8 shows the hydraulic tubes 207 exploded out of the tube compartment 206, those skilled in the art can readily envision how hydraulic tubes 207 will engage tube compartments 206. Unlike the FIG. 1 embodiment, the hydraulic tubes 207 are not completely enclosed within the wall space between main flow passage and the housing outer surface, but the hydraulic tubes are sufficiently recessed in the tube compartments that the surface of the hydraulic tubes do not extend past the outer surface of the sub housing. In other words, the tube compartments 206 are still considered to be formed in a wall space between the main flow passage and the housing outer surface. And while this configuration is preferred to protect the hydraulic tubes, there could be specialized embodiments where the hydraulic tube surfaces extend beyond the housing outer surface.

Figure 9:
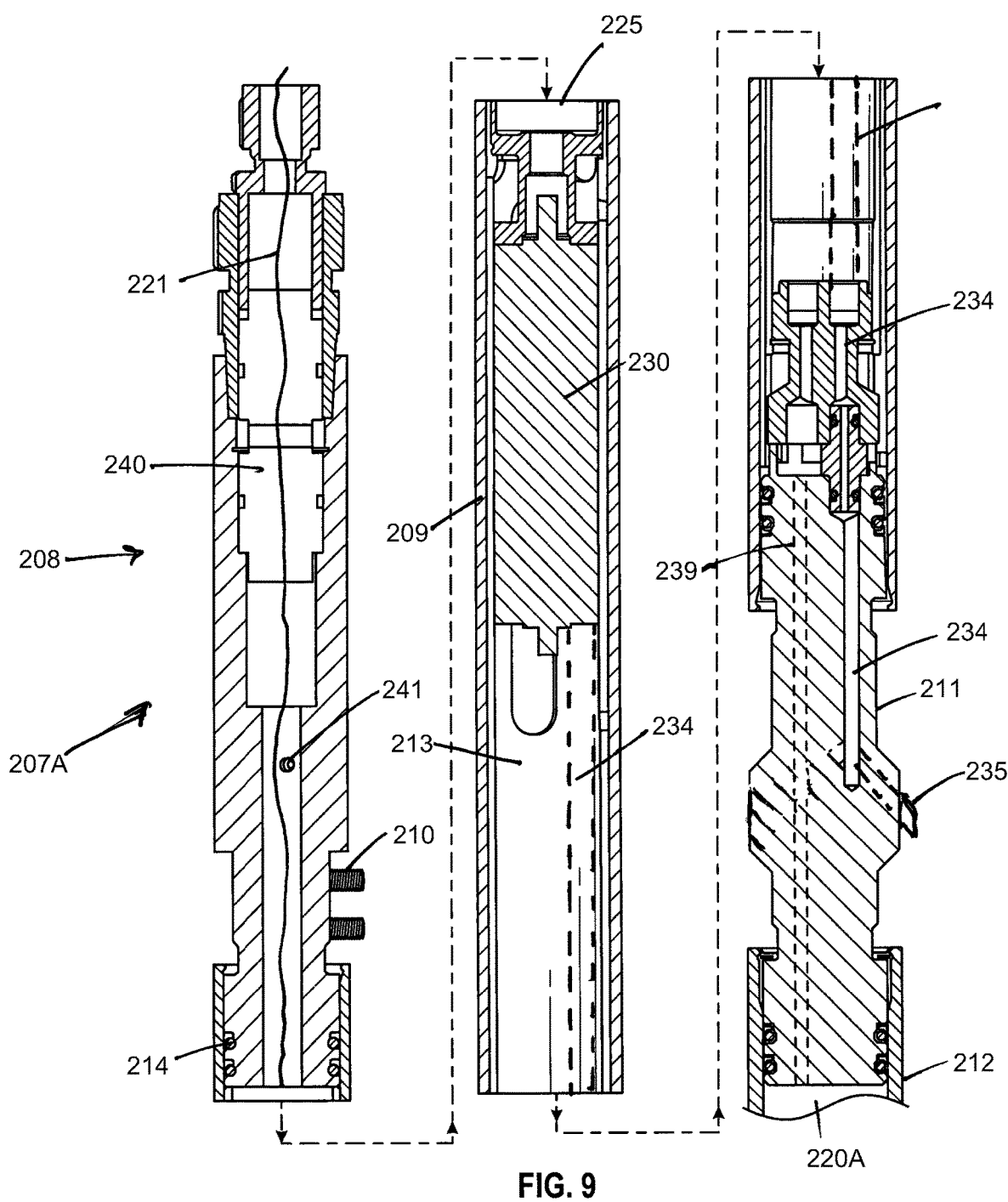
FIG. 9 illustrates a first hydraulic tube employed in the FIG. 8 embodiment.

FIG. 9 illustrates in more detail the upper portion of hydraulic tube 207A. A tube end 208 will engage the upper tube section 209. Tube end 208 is one structure for supporting the bulk head 240 which allows power/control wires 221 to extend to drive motor 225 while still sealing hydraulic fluid within the hydraulic tube 207A. Normally, hydraulic fluid may fill the internal space of the tube end 208 below bulkhead 240. Vent port 241 may act as an escape vent as the upper tube section 209 is filled with hydraulic fluid. Tube end 208 also supports attachment bolts 210 while cooperating with brackets (not shown) to secure the hydraulic tubes in tube compartments 206. The o-rings 214 seal tube end 208 to upper tube section 209. Positioned within upper tube section 209 are drive motor 225 and hydraulic motor 230 (also sometimes referred to as "pump" 230). The pump retainer 213 engages hydraulic motor 230 to keep it and the drive motor positioned in the hydraulic tube and to resist any tendency to rotate which may be imparted by the drive motor. Fluid pressurized by hydraulic motor 230 is directed through internal passage 234, from the hydraulic motor output, through intermediate tube connector 211, and finally to external control line 235. The reservoir passage 239 allows the supply of fluid from fluid reservoir 220A (formed with lower tube section 212) to hydraulic motor 230. In the FIG. 9 embodiment, hydraulic fluid fills the upper tube section between bulkhead 240 and the upper end of the connector tube 211. This essentially places electric motor 225 and hydraulic motor 230 in a bath of hydraulic fluid.

Figure 10:
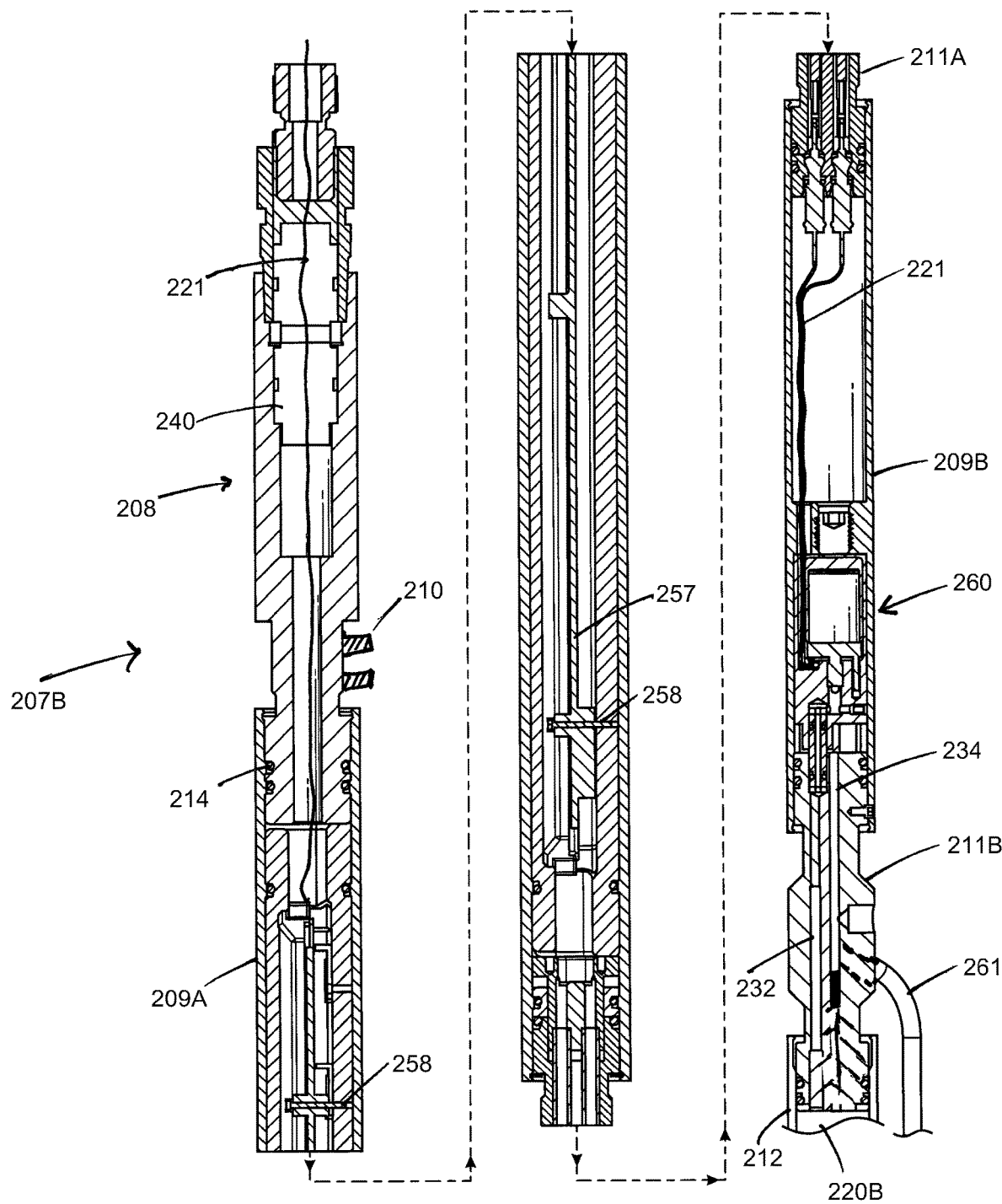
FIG. 10 illustrates a second hydraulic tube employed in the FIG. 8 embodiment.

FIG. 10 illustrates in more detail the upper portion of hydraulic tube 207B. FIG. 10 shows a tube end 208 similar to that described with reference to FIG. 9. However, hydraulic tube 207B includes two upper tube sections 209a and 209b joined by tube connector/plug bulkhead 211a. The power/control wires 221 extend from the plug bulkhead 240 to electronics card 257 secured in tube section 209a with card retaining screws 258. Typically, the space containing electronics card 257 is filled with air or an inert gas. Wires from electronics card 257 extend through tube connector/bulkhead 211a to the fail-to-open valve 260, which may be one of the valve types described above. The tube connector 211b positioned below fail-to-open valve 260 forms the connection to the lower tube section 212 containing the reservoir 220B. Typically, the space between tube connectors 211a and 211b will be filled with hydraulic fluid. The reservoir feed line 232 extends through tube connector 211b in order to connect with control line passage 234 which ultimately feeds control line 261. It will be understood that valve 260 controls the connection between reservoir feed line 232 and control line passage 234. Thus, when valve 260 is open, fluid can flow between reservoir 220B and the control line 261, but when valve 260 is closed, fluid cannot communicate between reservoir 220B and control line 261.

Figure 11:
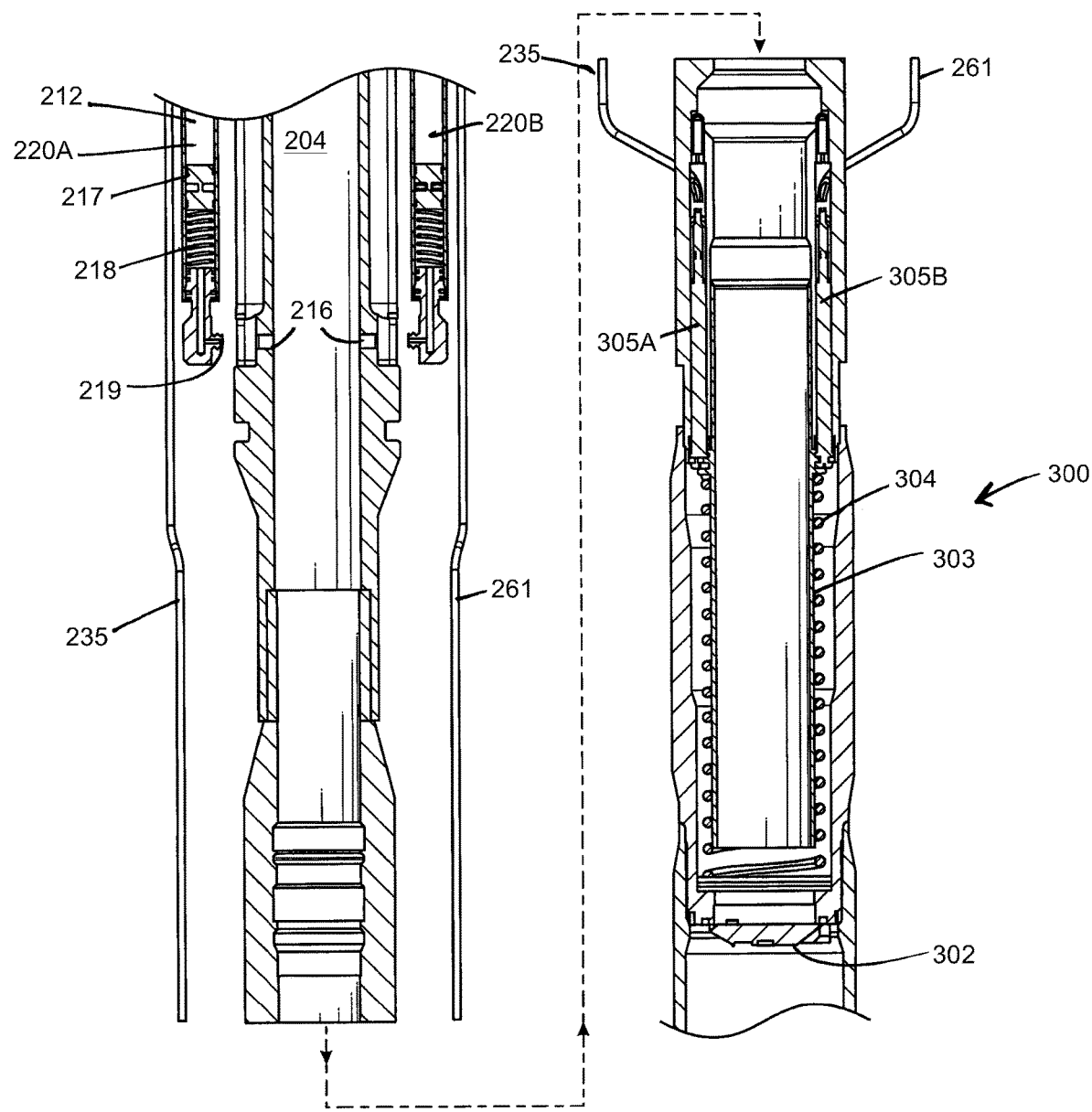
FIG. 11 illustrates the safety valve in the FIG. 8 embodiment.

FIG. 11 illustrates the lower ends of hydraulic tubes 207 and the safety valve 300. The fluid reservoirs 220A and 220B are created in the lower tube sections 212. As in previous embodiments, the reservoir includes the piston 217 being biased by spring 218 in order to create a positive pressure in the reservoir. Likewise, the spring side of piston 217 is exposed to the hydrostatic fluid pressure within main flow passage 204 via equalization port 216 communicating with port connector 219 below piston 217. As described previously, this results in the reservoir pressure being the sum of the main passage pressure and the pressure induced by spring 218 acting on piston 217. In reference to safety valve 300 (shown with flapper 302 in the closed position), control line 235 communicates with piston 305A while control line 261 communicates with piston 305B. As described previously, pressurized fluid from control line 235 acts on piston 305A, which in turn forces flow tube 303 downward (toward flapper 302), thus compressing return spring 303 and moving flapper 302 to the open position. It will be further understood that flow tube 303's downward movement also tends to pull piston 305B downward with flow tube 303. If power is not applied to fail-to-open valve 260, that valve will be in the open position. With valve 260 open, downward movement of piston 305B will draw hydraulic fluid from reservoir 220B (through passages 232 and 234 seen in FIG. 10), in addition to the spring 218 in reservoir 220B tending to move fluid toward piston 305B. When power is applied to valve 260 moving it to the closed position, the fluid behind piston 305B (and in control line 261) cannot return to reservoir 220B, even if fluid pressure against piston 305A is removed because hydraulic motor 230 slows or stops. Thus, piston 305B holds flapper 302 open as long as power is supplied to fail-to-open valve 260.

As one example mode of operating the actuator sub 201 and the associated safety valve 300 from the flapper closed to the flapper option position could be as follows. With fail-to-open valve 260 powered down (i.e., open), the hydraulic motor is first activated, causing pressure in control line 235 to increase and act against piston 305A in order to move flow tube 303 and flapper 302 into the open state. Next, power is applied to fail-to-open valve 260 causing valve 260 to move to the closed state. Finally, operation of hydraulic motor 230 is ceased (or substantially reduced), thereby allowing fluid behind piston 305A to equalize at the pressure of hydraulic reservoir 220A. However, flow tube 303 and flapper 302 cannot move to the closed state since the closed valve 260 is maintaining pressure on piston 305B.

It can be seen how in the above described embodiment, the first activating piston and bi-directional motor, in essence, form part of a first hydraulic circuit, while the second activating piston and fail-to-open valve form part of a second hydraulic circuit, where these circuits are completely hydraulically separated (or hydraulically isolated) from one another. These circuits are hydraulically isolated in the sense that they do not share the same hydraulic fluid. This isolation can provide the advantage of the fail-to-open valve not coming into contact with hydraulic fluid which has cycled through the bi-directional motor. This is advantageous in cases where the motor may degrade over time and introduce small debris into the hydraulic fluid which would, in absence of the hydraulic isolation, have the potential to obstruct the fail-to-open valve. Although the FIG. 8 embodiment shows two separate hydraulic tubes to create the two isolated hydraulic circuits, there could also be embodiments where the two isolated circuits are formed in a single tube.

In many operational circumstances, the hydraulic reservoirs 220 may not be filled with sufficient hydraulic fluid to actually place springs 218 in compression (see FIG. 11). In such circumstances, the springs 218 do not contribute to pressure created in reservoirs 220 and the pressure of the hydraulic fluid in reservoirs 220 will be equal to the pressure in main flow passage 204 via fluid through equalization ports 216 acting on pistons 217. It will be apparent in this situation that the fluid pressure in the main flow passage is transmitted, through the fluid reservoir associated with the fail-to-open valve, to act on the second activating piston when the fail-to-open valve is in the open position. Similarly, when the hydraulic motor is not in operation, the fluid pressure acting on the first activating piston will likewise be equal to the pressure in the main flow passage. This results in there being a balanced pressure across the seals on the activating pistons, i.e., the pressure on the "back" side of the seals originating from the hydraulic reservoirs is the same as the pressure on the "front" side of the seals which are directly exposed to the pressure within the main flow passage 204. The ability to maintain balanced pressure across the seals of the activating pistons (except when the flapper is actually being opened or closed) should significantly increase the operational life of these seals, and thus the overall life of the safety valve.

While the depicted embodiments of the actuator sub 1 generally show at least two hydraulic tubes, other embodiments not illustrated might be implemented with a single hydraulic tube enclosing all components required to carry out the functions described above.

In certain embodiments, the closed hydraulic system is pressure compensated to the ID of the tubular tied to the safety valve. This pressure compensation balances the hydraulic load across the rod piston seals. The compensation feature has a floating piston that can supply ample fluid to operate the valve and has sufficient volume for thermal expansion. The hydraulic actuator needs to only overcome force from the spring to open the valve. A preferred embodiment will feature an electric drive motor.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or possibly as much as +/−20%. Similarly, the term "substantially" will typically mean at least 85% to 99% of the characteristic modified by the term. For example, "substantially all" will mean at least 85%, at least 90%, or at least 95%, etc.

The invention claimed is:

1. A subsurface safety valve comprising:
   (a) a flapper moving between an open and closed state corresponding to the position of a flow tube;
   (b) a return spring biasing the flow tube in a flapper closed state;
   (c) a first activating piston engaging the flow tube, the first activing piston connected to a pump configured to direct pressurized fluid against the first activating piston, wherein (i) the pump is a bi-directional hydraulic motor, and (ii) the first activating piston and pump form part of a first hydraulic circuit;
   (d) a second activating piston engaging the flow tube, the second activating piston connected to a fail-to-open valve configured to close when power is applied to the fail-to-open valve and to open when power is removed from the fail-to-open valve, wherein the second activating piston and fail-to-open valve form part of a second hydraulic circuit which is substantially hydraulically isolated from the first hydraulic circuit; and
   (e) a controller configured to perform the steps of (i) driving the bi-directional hydraulic motor until the first activating position has moved the flow tube to an open flapper state, (ii) after step (i), applying power to the fail-to-open valve in order to close the fail-to-open valve, and (iii) after step (ii), ceasing or substantially reducing operation of the bi-directional hydraulic motor.

2. The safety valve according to claim 1, wherein the first and second hydraulic circuits include separate fluid reservoirs.

3. The safety valve according to claim 2, wherein a piston in the fluid reservoir associated with the second hydraulic circuit displaces fluid directed through the fail-to-close valve toward the second activating piston.

4. The safety valve according to claim 3, wherein (i) the bi-directional hydraulic motor and the fluid reservoir supplying the hydraulic motor is enclosed a first hydraulic tube, and (ii) the fail-to-open valve and the fluid reservoir supplying the fail-to-open valve is enclosed in a second hydraulic tube.

5. The safety valve according to claim 4, further comprising a sub housing including (i) an outer surface, (ii) a main flow passage extending though the sub housing, and (iii) a wall space formed between the main flow passage and the housing outer surface, wherein the first and second hydraulic tubes are positioned within the wall space.

6. The safety valve according to claim 5, further comprising an equalization port communicating between the fluid reservoirs of the hydraulic tubes and the main flow passage, whereby fluid pressure in the main flow passage is transmitted, through the fluid reservoir associated with the fail-to-open valve, to act on the second activating piston when the fail-to-open valve is in the open position, thereby producing a balanced pressure across seals on the second activating piston.

7. The safety valve according to claim 1, further comprising the absence of a check valve between the hydraulic motor and the first activating piston.

8. The safety valve according to claim 1, wherein the bi-directional hydraulic motor is powered by an electric drive motor connected to a power supply at a well surface.

9. The safety valve according to claim 1, wherein the hydraulic motor, when not under power, allows the reverse flow of fluid through the hydraulic motor.

10. The safety valve according to claim 1, wherein transition from the open flapper state to a closed flapper state drives reverse flow of fluid through the hydraulic motor.

* * * * *